United States Patent [19]

Nose et al.

[11] Patent Number: 5,033,856
[45] Date of Patent: Jul. 23, 1991

[54] THREE-DIMENSIONAL SHAPE MEASURING APPARATUS

[75] Inventors: Noriyuki Nose, Kawasaki; Yukichi Niwa, Narashino, both of Japan

[73] Assignee: Canon Kabushiki Kaisha, Tokyo, Japan

[21] Appl. No.: 517,514

[22] Filed: Apr. 30, 1990

Related U.S. Application Data

[63] Continuation of Ser. No. 289,534, Dec. 27, 1988, abandoned, which is a continuation of Ser. No. 135,462, Dec. 21, 1987, abandoned, which is a continuation of Ser. No. 750,281, Jul. 1, 1985, abandoned.

[30] Foreign Application Priority Data

Jul. 5, 1984 [JP] Japan .............................. 59-137902
Jul. 5, 1984 [JP] Japan .............................. 59-137903

[51] Int. Cl.$^5$ .............................................. G01B 11/24
[52] U.S. Cl. ................................ 356/376; 250/201.2
[58] Field of Search ............... 356/271, 375, 376, 372; 250/201

[56] References Cited

U.S. PATENT DOCUMENTS

| | | | |
|---|---|---|---|
| 3,762,821 | 10/1973 | Bruning et al. ................. | 250/201 X |
| 3,847,485 | 11/1974 | Zanoni ................................ | 356/375 |
| 4,374,324 | 2/1983 | Van Rosmalen et al. .......... | 250/201 |

FOREIGN PATENT DOCUMENTS

| | | | |
|---|---|---|---|
| 211506 | 12/1982 | Japan .................................... | 356/376 |
| 122410 | 7/1983 | Japan .................................... | 356/371 |
| 27207 | 2/1984 | Japan .................................... | 356/376 |

OTHER PUBLICATIONS

Frosch et al, *IBM Technical Disclosure Bulletin*, vol. 15, No, 2, Jul. 1972, pp. 504 and 505.

*Primary Examiner*—F. L. Evans
*Attorney, Agent, or Firm*—Fitzpatrick, Cella, Harper & Scinto

[57] ABSTRACT

A three-dimensional shape measuring apparatus having a high performance and a reduced drive energy is disclosed. At least a portion of an in-focus state detection optical system having an internal light source is movable while maintaining a light path near an object lens of the optical system. A distance of movement of the movable portion which is moved with auto-focusing operation for an object is measured and the three-dimensional shape is measured precisely with a high stroke. An inclination angle measuring optical system which shares the light path near the object lens with the in-focus state detection optical system and has an internal light source is provided in a common casing. Thus, the distance of movement of the movable part of the in-focus state detection optical system and an inclination angle are simultaneously measured so that the three-dimensional shape can be more precisely measured.

47 Claims, 4 Drawing Sheets

THREE-DIMENSIONAL SHAPE MEASURING APPARATUS

This application is a continuation-in-part continuation of application Ser. No. 07/289,534 filed Dec. 27, 1988, which is a continuation of application Ser. No. 07/135,462 filed Dec. 21, 1987, which is a continuation of application Ser. No. 06/750,281 filed July 1, 1985, all of which are now abandoned.

BACKGROUND OF THE INVENTION

1. Field of the Invention

The present invention relates to a three-dimensional shape measuring apparatus, and more particularly to a non-contact and fast three-dimensional shape measuring apparatus.

2. Description of the prior Art

In the past, various methods have been used to non-contact measure a three-dimensional shape. They include an interference measuring method which uses a coherent light, and a method of reading a light sectional image with slit light. The interference measuring method has an advantage in that all surfaces of an object can be simultaneously measured with a high precision but a disadvantage in that the measurement of the shape is difficult to attain when an irregularity on the surface of the object is much larger than a light wavelength. In the light sectional image reading method, it is difficult to measure an irregular shape of an order of the light wavelength and hence a high precision measurement is not attained. In order to resolve the above disadvantages, a three dimensional shape measuring method has been proposed in which an in-focus state detection optical system having an internal light source is mounted on a carriage which is moved such that the optical system is focused to an surface of an object. (Japanese Patent Publication No. 40231/1971). In this method, the shape is measured with a high precision irrespective of the irregularity on the surface of the object. However, in the prior art method, a large quantity of energy is required to move the carriage which carries the in-focus state detection optical system because of the large weight of the movable portion.

When a fine irregularity is included on the surface of the object, more exact information is obtained by expressing the irregular shape by height or distance as well as an inclination angle than by expressing it only by the distance. In the prior art methods, exact information cannot be obtained by this method.

SUMMARY OF THE INVENTION

It is an object of the present invention to provide a three-dimensional shape measuring apparatus having a high stroke and a low drive energy.

It is another object of the present invention to provide a three-dimensional shape measuring apparatus having a high precision.

The three-dimensional shape measuring apparatus of the present invention has an in-focus state detection optical system having an internal light source, at least a portion of the optical system is movable while keeping a light path near an object lens in order to bring the optical system into an in focus position. A distance of movement of the movable portion is measured. Thus, the apparatus with a low drive energy is attained.

To attain a higher precision measurement, the three-dimensional shape measuring apparatus of the present invention has the in-focus state detection optical system having an internal light source. At least a portion of the optical system or a casing thereof is movable while keeping a light path near an object lens in order to bring the optical system into the in-focus position. A distance of movement of the movable portion is measured. An inclination angle measuring optical system having an internal light source which shares the light path near the object lens with the in-focus state detection optical system is provided.

The three-dimensional shape measuring apparatus of the present invention has the in-focus state detection optical system or that optical system and the inclination angle measuring optical system. A distance of movement of the movable portion is measured so that a position is measured with a low drive energy. By adding the measurement of the inclination angle, the three-dimensional shape measurement with high precision, high speed and high stroke is attained.

DETAILED DESCRIPTION OF THE PREFERRED EMBODIMENTS

Figure 1:
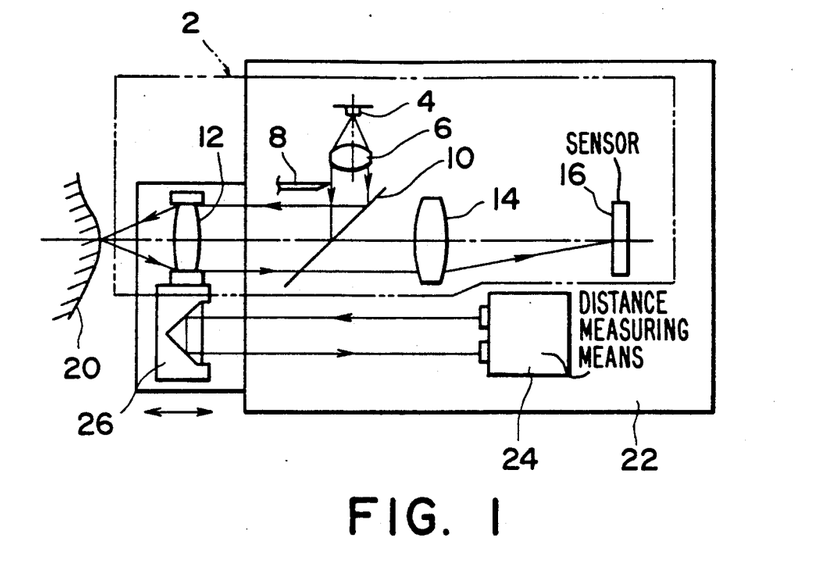
FIG. 1 shows an embodiment of a three-dimensional shape measuring apparatus of the present invention.

FIG. 1 shows a first embodiment of a three-dimensional shape measuring apparatus of the present invention. Numeral 2 denotes an in focus state detection optical system, numeral 4 denotes a light source, numeral 6 denotes a collimator lens, numeral 8 denote a knife edge, numeral 10 denotes a half-mirror, numeral 12 denotes an object lens, numeral 14 denotes a lens, numeral 16 denotes an optical sensor, numeral 20 denotes an object whose shape is to be measured, numeral 22 denotes a casing of the three-dimensional shape measuring apparatus, numeral 24 denotes a distance measurement means and numeral 26 denotes a corner cube.

Light emitted from the light source 4 is collimated by the collimator lens 6, and the collimated light is reflected by the half-mirror 10 toward the object lens 12. The collimated light from the collimator lens 6 is particularly screened by the knife edge 8, and only one (upper) of two zones divided by a boundary surface passing through an optical axis X impinges on the object lens 12. The light focused by the object lens 12 forms a spot image on the surface of the object 20. The reflected light from the spot again passes through the object lens 12 and the half-mirror 10 and is focused by the lens 14 and reaches the sensor 16. The light reaching the sensor 16 changes depending on the distance between the surface of the object 20 and the object lens 12. This change of the light is detected to discriminate the in-focus state.

The in-focus state detection method in the present embodiment is explained with reference to FIG. 2, in which the like elements to those shown in FIG. 1 are designated by the like numerals. X denotes an optical axis, (a) shows an in-focus position, (b) shows a rear-focus position and (c) shows a fore-focus position. An area below the optical axis X is called a zone A and an area above the optical axis X is called a zone B.

Figure 2:
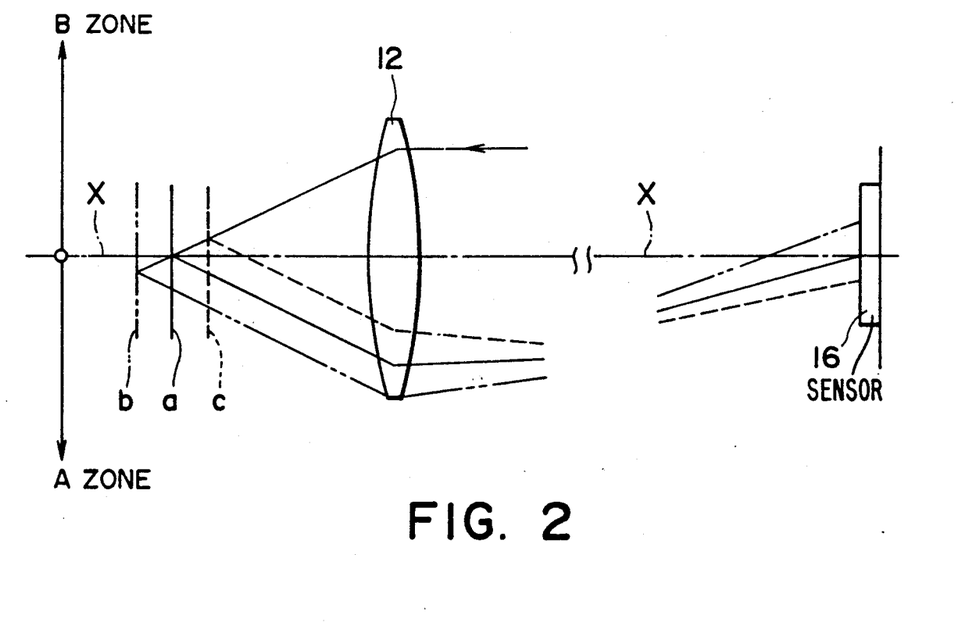
FIG. 2 illustrates an in-focus state detection method.

When the surface of the object 20 is at the focal point of the object lens 20 ((a) in FIG. 2), the spot on the surface of the object 20 is centered on the optical axis X and the reflected light is centered on the optical axis X at the sensor 16. When the surface of the object 20 is further than the focal point of the object lens 12 ((b) in FIG. 2), the spot on the surface of the object 20 is positioned in the zone A deviated from the optical axis X. Accordingly, the reflected light is positioned in the zone B in the sensor 16. On the other hand, when the surface of the object 20 is closer than the focal point of the object lens 12 ((c) in FIG. 2), the spot on the surface of the object 20 is deviated from the optical axis X and positioned in the zone B. Accordingly, the reflected light is positioned in the zone A in the sensor 16. By using a sensor array such as CCD sensor array as the sensor 16 and arranging sensor segments of the same size over the zones A and B and the optical axis X on the surface of the sensor 16, the focus state can be detected by checking a difference between the outputs of the sensor segments in the zones A and B.

Figure 3:
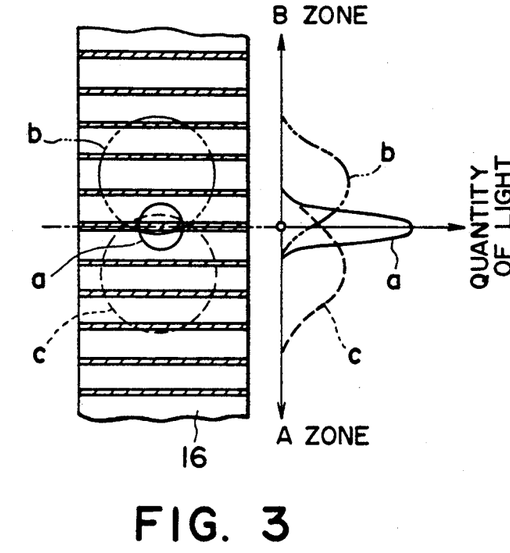
FIG. 3 is a plan view of a sensor.
Figure 4:
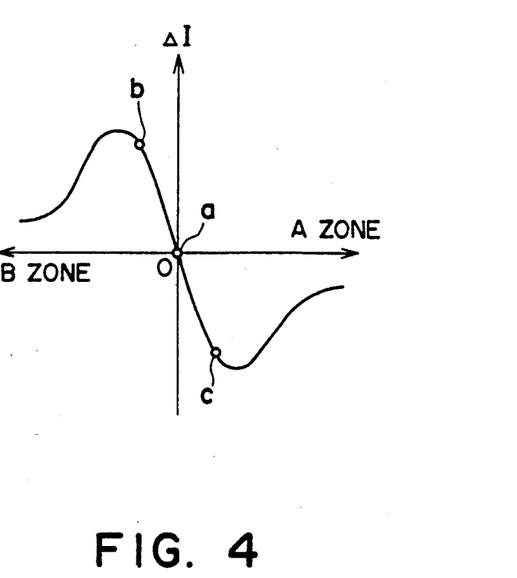
FIG. 4 shows a sensor output.

FIG. 3 shows a plan view of the sensor 16. It is viewed from the left side of the sensor 16 shown in FIG. 2. Hatched areas show channel stoppers which isolate the sensor segments. The spot positions and the light intensities when the surface of the object 20 is at (a), (b) and (c) in FIG. 2 are shown. A sum of the outputs of the sensor segments in the zone B of the sensor 16 is represented by $I_B$ and a sum of the outputs in the zone A is represented by $I_A$. $\Delta I = I_B - I_A$ changes depending on the focus state of the optical system 2 relative to the object 20. A relation therebetween is shown in FIG. 4. In the vicinity of the in-focus state area ((a) in FIG. 4), $\Delta I$ changes in a substantially linearly manner. From this characteristic, it is possible to check whether the optical system 2 is in the fore-focus state, in-focus state or rear-focus state.

Thus, auto-focusing operation can be attained by servo-driving a portion of the optical system 2 to bring the difference $\Delta I$ to zero.

In the present embodiment, the elements of the optical system 2 except the object lens 12 are mounted in the casing 22, and the object lens 12 is movable relative to the casing 22. The object lens 12 is moved along the optical axis and it may be driven by an actuator (not shown) attached to the casing 22. The actuator preferably has a hydro-dynamic bearing slide mechanism to attain a high precision control of the distance of movement.

Distance measurement means is provided in the present apparatus to measure the distance of movement of the object lens which is moved by the actuator. As shown in FIG. 1, the distance measurement means 24 of a type which counts the number of waves of a laser interferometer is attached to the casing 22, and the corner cube 26 which is a part of the distance measurement means is mounted on the object lens 12. The laser beam emitted from the means 24 is reflected by the corner cube 26 and directed to the means 24.

In the auto-focusing operation, the distance of movement of the object lens 12 is measured by the distance measurement means so that a position on the surface of the object 20 at which the optical axis crosses is determined. By carrying out the position measurement on the entire surface of the object, the three-dimensional shape can be measured.

The performance of the three-dimensional shape measuring apparatus of the present embodiment is evaluated below.

The precision of the position measurement is determined by both the resolution of the in-focus state by the optical system 2 and the precision of the distance measurement means. For example, when the object lens 12 has a focal distance $f=2.1$ mm and $NA=0.9$, the lens 6 has a focal distance $f_1=6.6$ mm, the lens 14 has a focal distance $f_2=85$ mm and the sensor 16 is a CCD array sensor, a gradient in the linear area in the graph of FIG. 4 is 200–1,000 mV/$\mu$m and a noise in the output $\Delta I$ is smaller than 1–2 mV. Thus, the in-focus state discrimination resolution of the optical system 2 is 0.01–0.02$\mu$m. When the distance measurement means of the type which counts the number of waves of the laser interferometer is used, precision of 0.1–0.01$\mu$m is achieved. The distance measurement means may be a light heterodyne interference system (e.g. Hewlett Packard Laser Distance Measurement Device, O pulse E, p 82, December 1982) or a grid interference distance measurement system (O pulse E, p 84 -, April 1981), and similar precision can be achieved.

The stroke of the position measurement is determined by the stroke of the actuator and the stroke of the distance measurement means. The grid interference distance measurement system, light heterodyne interference system and laser interferometer wave counting system can attain a high stroke of longer than 100 mm. The actuator can also attain a similar stroke.

A diameter of the light spot is determined by the NA of the object lens 12. When the object lens 12 has $NA=0.8$, the diameter $\phi$ of the light spot of the optical system 2 is $\phi=2.44$ F$\lambda \approx 2.38\mu$m (where $$F = 2 \times \frac{1}{2NA} = 1.25,$$

$\lambda=0.78\mu$m) and the spot of approximately 2 $\mu$m in diameter can be measured. When a larger spot diameter is desired, the effective light beam diameter of the optical system 2 is reduced to reduce the effective NA of the light beam.

In the present embodiment, since the point on the optical axis X on the surface of the object 20 and the sensor 16 are conjugate in the in-focus state, the measurement is attained when the surface of the object 20 is either mirror-finished or irregular, if the NA of the object lens 12 is large.

Figure 5:
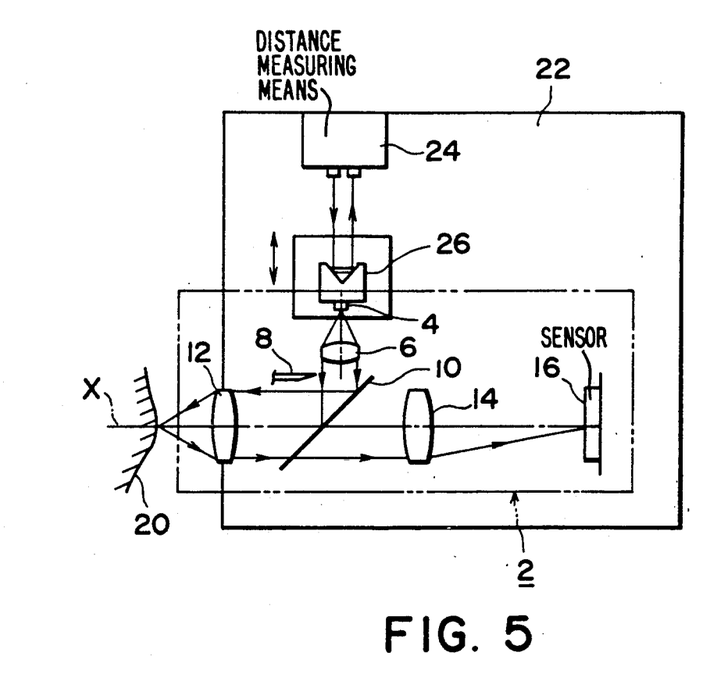
FIG. 5 shows another embodiment of the three-dimensional shape measuring apparatus of the present invention.

FIG. 5 shows a second embodiment of the three-dimensional shape measuring apparatus of the present invention. Like elements to those shown in FIG. 1 are designated by like numerals. The present embodiment differs from the first embodiment only in that the object lens 12 is fixed to the casing 22 and the light source 4 is movable relative to the casing 22. The light source 4 is moved along the optical axis of the collimeter lens 6 by an actuator (not shown) arranged in the casing 22. The distance measurement means 24 is mounted in the casing 24 and the corner cube 26 which is a part of the distance measurement means is mounted in the light source 4. The auto-focusing operation is carried out by moving the light source 4 and the distance of movement of the light source 4 is measured by the distance measurement means so that the position on the surface of the object 20 at which the optical axis X crosses is determined. In the present embodiment, it is necessary to convert the distance of movement of the light source 4 to the distance of movement of the focusing position of the light beam transmitted through the object lens 12.

The embodiments described above have the in-focus state detection optical systems. An embodiment of the three-dimensional shape measuring apparatus which also has an inclination angle measuring optical system to enable more precise measurement is now described.

Figure 6:
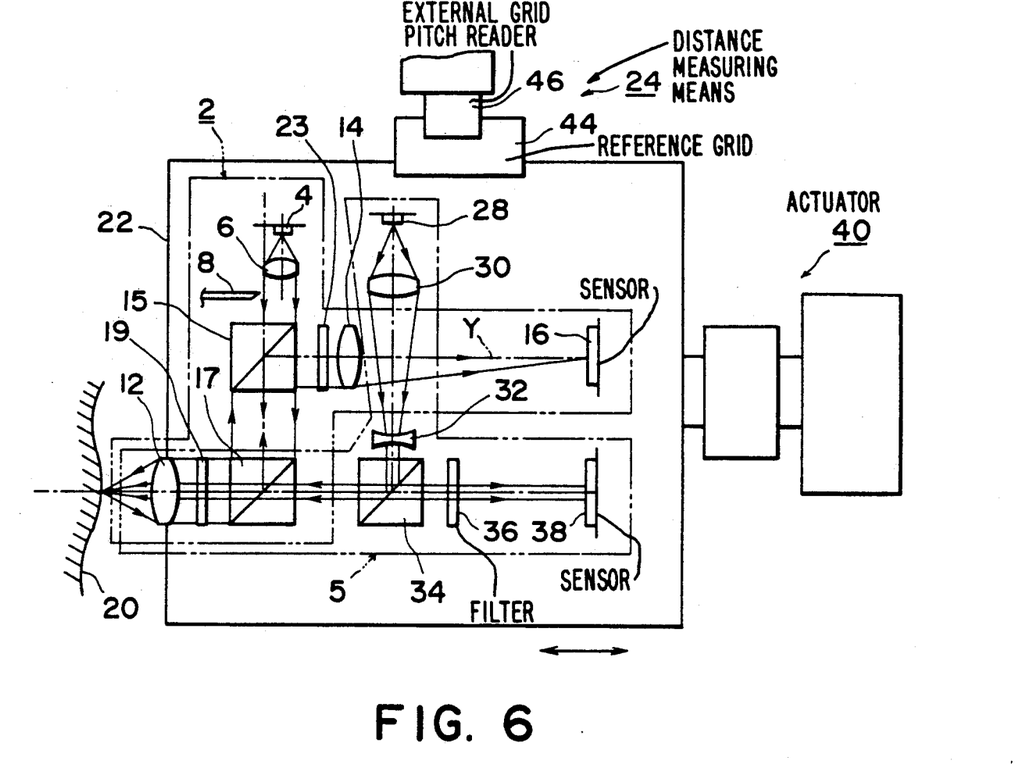
FIG. 6 shows an other embodiment of the three-dimensional shape measuring apparatus of the present invention having an inclination angle measuring optical system.

FIG. 6 shows a third embodiment of the three-dimensional shape measuring apparatus of the present invention. Like elements to those shown in FIG. 1 are designated by like numerals Numeral 5 denotes an inclination angle measuring optical system. The optical systems 2 and 5 are assembled in the casing 22.

In the in-focus state detection optical system 2, numeral 4 denotes a light source, numeral 6 denotes a knife edge, numeral 15 denotes a polarization beam splitter, numeral 17 denotes a half-mirror, numeral 19 denotes a quarter wavelength plate, numeral 12 denotes an object lens, numeral 23 denotes a band-pass filter, numeral 14 denotes a lens and numeral 16 denotes an optical sensor.

In the inclination angle measuring optical system 5, numeral 28 denotes a light source, numerals 30 and 32 denote lenses, numeral 34 denotes a polarization beam splitter, numeral 36 denotes a band-pass filter and numeral 38 denotes an optical sensor. The optical system 5 shares the half-mirror 17, quarter wavelength plate 19 and object lens 12 of the optical system 2.

The casing 22 is connected to an external actuator 40. The casing 22 is moved along the optical axis X of the object lens 12 by driving the actuator 40. The actuator 40 preferably has a hydrodynamic bearing slide mechanism in order to achieve a high precision control of the distance of movement.

The distance measurement means 24 for measuring the distance of movement is arranged in the casing 22. The distance measurement means 24 may be of grid interference distance measurement system (O pulse E, p 84 -, April 1981). In FIG. 6, numeral 44 denotes a reference grid fixed to the casing 22 and numeral 46 denotes an external grid pitch reader.

The light emitted from the light source 4 is collimated by the collimator lens 6 and the collimated light beam passes through the polarization beam splitter 15, is reflected by the half-mirror 17, passes through the quarter wavelength plate 19 and is directed to the object lens 12. The collimated light beam from the collimator lens 6 is partially screened by the knife edge 8 and is directed to only one (upper) of two zones in the object lens 12 divided by a boundary plane passing through the optical axis X. The light focused by the object lens 12 forms a spot on the surface of the object 20. The reflected light from the spot again passes through the object lens 12 and the quarter wavelength plate 19 and is reflected by the half-mirror 17 and the beam splitter 15, passes through the band-pass filter 23 and the lens 14, and reaches the sensor 16. The in-focus state, fore-focus state or rear-focus state of the optical system 2 is thus determined in accordance with the principle shown in FIGS. 2–4. The auto-focusing operation is carried out by servo-dividing the actuator 40 to bring $\alpha I(= I_B - I_A)$ to zero. In the present embodiment, neither the object lens or the light source is moved; rather, the entire casing 22 is moved along the optical axis X to focus the optical system. The position on the surface of the object 20 at which the optical axis X crosses can be determined by measuring the distance of movement of the casing 22 by the distance measurement means 24. The three-dimensional shape can be measured by carrying out the position measurement for the entire surface of the object.

An inclination angle measurement method by the inclination angle measuring optical system 5 of the present invention is now explained.

The light emitted from the light source 28 passes through the lenses 30 and 32 and is collimated, and the collimated light beam is directed to the polarization beam splitter 34 and reflected thereby, and the reflected light passes through the half-mirror 17 and the quarter wavelength plate 19 and is focused by the object lens 12. In the optical system 5, the light beam directed to the object lens 12 is centered at the optical axis X and directed in parallel to the optical axis X. The light focused by the object lens 12 forms a spot centered on the optical axis X on the surface of the object 20. The reflected light from the spot again passes through the object lens 12, quarter wavelength plate 19, half-mirror 17, polarization beam splitter 34 and band-pass filter 36 and reaches the sensor 38.

Figure 7:
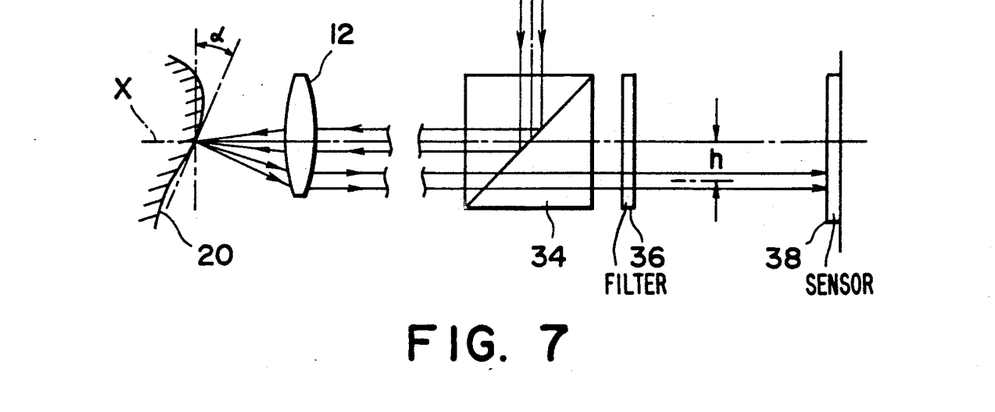
FIG. 7 illustrates an inclination angle measuring method.

The light reaching the sensor 38 changes depending on the inclination angle of the surface of the object 20. Referring to FIG. 7, if the surface of the object 20 inclined relative to a plane normal to the optical axis X by an angle $\alpha$ at a position on the optical axis X, the reflected light from the spot is directed to the object lens 12 with an inclination angle of $2\alpha$. In FIG. 7, the light beam directed to the object lens 12 travels in parallel with the optical axis X and the center of the light beam is spaced from the optical axis X by $h = f \sin 2\alpha$ (where f is a focal distance of the object lens 12).

The sensor 38 may be a light beam center detection sensor or a position sensor, which measures the distance h, from which $\alpha$ is determined.

In the inclination angle measurement, it is necessary that the surface of the object 20 is at the focal point of the object lens 12. This condition is normally met by the focusing function of the optical system 2 and the actuator 40.

Since the in-focus state detection optical system 2 and the inclination angle measuring optical system 5 share certain portions thereof, the wave-lengths of the light sources of the respective optical systems or the polarizations are changed from each other to prevent crosstalk. To this end, the band-pass filters 23 and 36, the polarization beam splitters 15 and 34 and the quarter wavelength plate 19 are used.

The performance of the three-dimensional shape measuring apparatus of the present embodiment is essentially identical to that of the embodiment of FIG. 1 as to the precision of the position measurement.

The precision of the measurement of the inclination angle is determined by the precision of the position detection of the sensor 38. For example, when the detection precision of the sensor 38 is 0.3 $\mu$m and the focal distance of the object lens 12 is f = 3.3 mm, an inclination angle measurement precision of approximately 9" is attained. An inclination angle measurement range is 10–30° when the object lens 12 has NA = 0.5–0.9.

Figure 8:
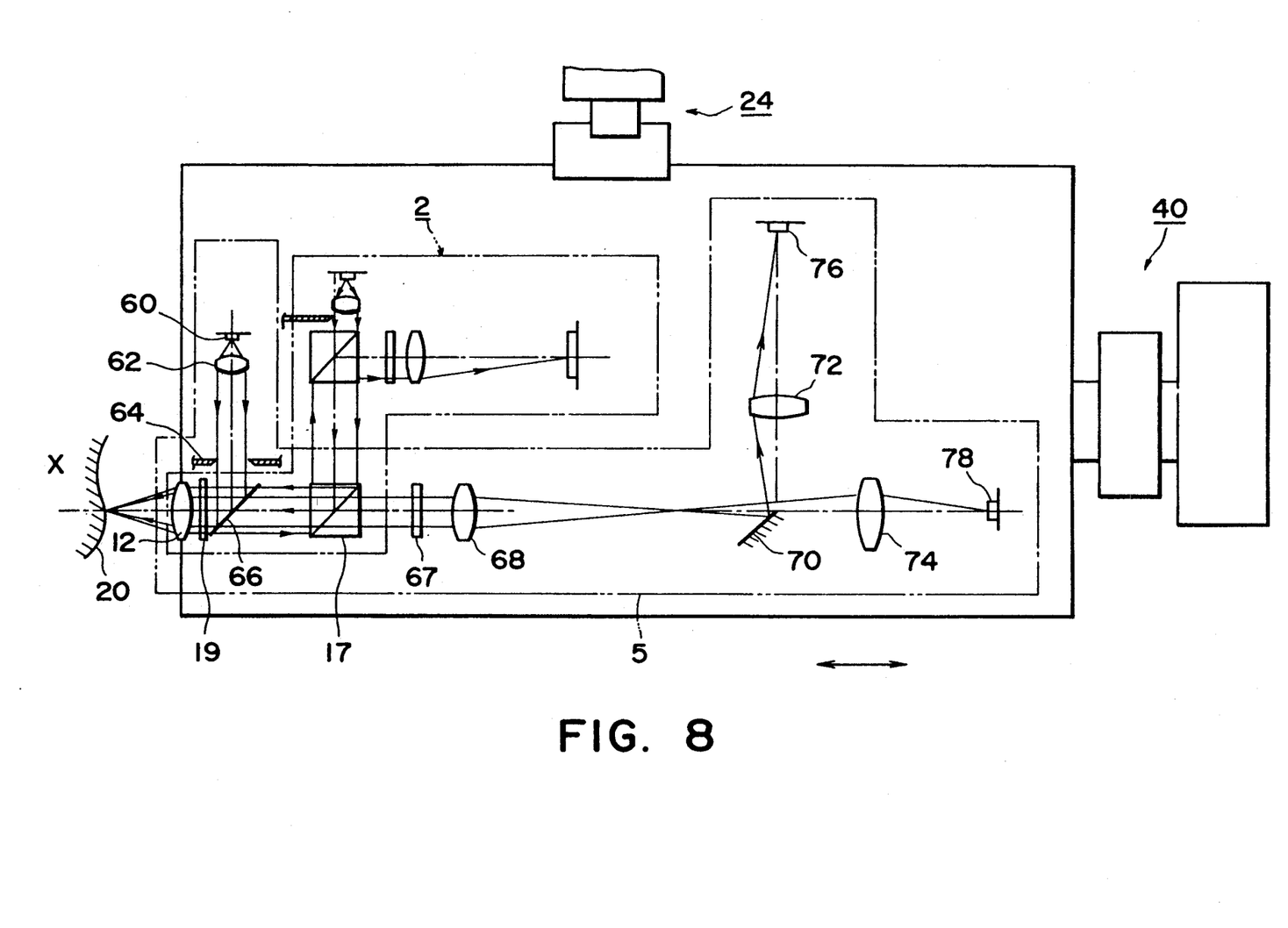
FIG. 8 shows an other embodiment of the three-dimensional shape measuring apparatus having the inclination angle measuring optical system.

FIG. 8 shows a fourth embodiment of the three-dimensional shape measuring apparatus of the present invention. The present embodiment is different from the third embodiment only in the construction of the inclination angle measuring optical system 5. In the optical system 5 of the present embodiment, numeral 60 denotes a light source, numeral 62 denotes a collimeter lens, numeral 64 denotes an aperture, numeral 66 denotes a half-mirror, numeral 67 denotes a bandpass filter, numeral 68 denotes a lens, numeral 70 denotes a mirror, numerals 72 and 74 denote a lens, and numerals 76 and 78 denote optical sensors. In the present optical system, the mirror 70 is located only in one (lower) of two zones divided by the boundary plane passing through the optical axis X. The aperture 64 and the mirror 70 are conjugate with respect to the object lens 12 and the lens 68. Namely, the aperture 64 is positioned at the focal point of the object lens 12.

In the optical system 5 of the present embodiment, if the surface of the object 20 is not inclined to the plane normal to the optical axis, the light reflected by the surface of the object 20 reaches the lens 68 without a shift from the optical axis X at a pupil position of tho object lens 12. Under this condition, the light intensity of the light which is reflected by the mirror 70 and reaches the sensor 76 through the lens 72 and the light intensity of the light which reaches the sensor 78 through the lens 74 without routing the mirror 70 are equal. The output of the sensor 76 and the output of the sensor 78 under this condition are set to be equal. When the surface of the object 20 inclines to the plane normal to the optical axis X, the light reflected by the surface of the object 20 is directed to the lens 68 with a parallel shift from the optical axis at the pupil position of the object lens 12. Thus, the light intensity of the light which is reflected by the mirror 70 and reaches the sensor 76 through the lens 72 and the light intensity of the light which reaches the sensor 78 through the lens 74 without routing the mirror 70 are different. The inclination angle is therefore determined based on the difference between the outputs of the sensors 76 and 78.

In the present embodiment, the entire in-focus state detection optical system 2 is moved. Alternatively, only a portion of the optical system 2 may be moved. For example, the object lens or the light source may be moved as shown in FIGS. 1 and 5. The size of the actuator can be reduced by reducing the size of the movable portion.

In the present embodiment, a so-called TTL-A²F (through the taking lens - active auto-focus) system (Journal of Television Institute of Japan, Vol. 35, No. 8, 1981, p 637 - ) is used for the auto focusing system, although other auto-focusing systems such as a system used for a video pickup and a system used for camera auto focusing may be used.

The inclination angle measuring optical system is not limited to the illustrated optical system but various modifications thereof such as combinations of the in-focus state detection optical system may be used.

Various modification of the three-dimensional shape measuring apparatus may be made without departing from the concept of the present invention.

As described hereinabove, the three-dimensional shape measuring apparatus of the present invention can measure a three-dimensional shape using a fine spot with high precision, high speed and high stroke. The precision of the measurement of the shape is further increased by the provision of an inclination angle measuring optical system. The drive energy is reduced by reducing the size of the movable portion, and a very practical apparatus is thereby provided.

What is claimed is:

1. An apparatus for optically measuring the shape of an object from a distance to each position of the object surface and the inclination at each position thereof, comprising:
   a casing;
   an in-focus state detection optical system having an object lens and contained in said casing, at least one of a portion of said in-focus state detection optical system and said casing being movable while keeping a light path near said object lens generally constant in order to bring said in-focus state detection optical system into an in-focus position relative to each position of the object surface;
   means for measuring the distance of movement of said at least one of said portion and said casing;
   an inclination measuring optical system for measuring the inclination of said each position of the object surface, said inclination measuring and said in-focus state detection optical systems having said object lens in common, wherein light beams incident on the object surface through said inclination measuring and said in-focus state detection optical systems are coincident with each other and focused at the same time when said in-focus state detection optical system is brought into said in-focus position.
   optical means for directing two kinds of light beams to each position of the object surface, said optical means focusing said light beams on said each position at the same time;
   first light receiving means for receiving a light beam produced by one of said light beams reflected by said each position, said first light receiving means detecting a distance to said each position along an optical axis of said optical means in accordance with a projection condition of said reflected light beam onto said first light receiving means; and
   second light receiving means for receiving a light beam produced by the other of said light beams reflected by said each position, said second light receiving means for detecting an inclination of said each position relative to a reference plane in accordance with a projection condition of said reflected light beam produced by the other of said light beams onto said second light receiving means.

2. An apparatus according to claim 1, wherein said measuring means optically measures said distance of movement.

3. An apparatus according to claim 2, wherein said measuring means comprises a laser interferometer and a corner cube mounted to said one of the portion and the casing, said laser interferometer being arranged opposite to said corner cube.

4. An apparatus according to claim 2, wherein said measuring means comprises a grid pitch reader and a reference grid mounted to said one of the portion and the casing, and said reader measures said distance of movement by a grid interference system.

5. An apparatus according to claim 1, wherein each of said in-focus state detection and said inclination measuring optical systems each includes a separate light source.

6. An apparatus according to claim 1, wherein wavelength ranges of light beams incident on the object surface through said in-focus state detection and said inclination measuring optical systems differ from each other.

7. An apparatus according to claim 1, wherein said inclination measuring optical system includes means for producing a light beam;
optical system means for converging the light beam produced by said producing means and directing the convergent beam toward said each position of the object surface to be examined; and
photoelectric conversion means for receiving a light beam reflected by said each position of the object surface for detecting the inclination of said each position of the object surface relative to a reference plane.

8. An apparatus for optically measuring a shape of an object surface from a distance to each position of the object surface and the inclination at each position thereof, comprising:
optical means for directing two kinds of light beams to each position of the object surface, said optical means focusing said light beams on said each position at the same time;
first light receiving means for receiving a light beam produced by one of said light beams reflected by said each position, said first light receiving means detecting a distance to said each position along an optical axis of said optical means in accordance with a projection condition of said reflected light beam onto said first light receiving means; and
second light receiving means for receiving a light beam produced by the other of said light beams reflected by said each position, said second light receiving means for detecting an inclination of said each position relative to a reference plane in accordance with a projection condition of said reflected light beam produced by the other of said light beams onto said second light receiving means.

9. An apparatus according to claim 8, wherein wavelength ranges of said light beams differ from each other.

10. An apparatus according to claim 8, wherein said optical means includes an object lens for directing said light beams to said each position in common.

11. An apparatus according to claim 8, wherein said first light receiving means is disposed conjugate with said each position of the object surface when said optical means has focused said light beams on said each position.

12. An apparatus according to claim 9, further comprising filter means for directing the light beams reflected by said each position, wavelength ranges of which differ from each other, to said first and second light receiving means, respectively.

13. An apparatus for measuring the shape of an object comprising:
illuminating means for illuminating a predetermined area on the object, said illuminating means illuminating with at least one light beam substantially condensed on the predetermined area;
detecting means for detecting a position wherein said light beam is substantially condensed on the predetermined area;
adjusting means for adjusting a distance between said position and the predetermined area based upon a result obtained by the detection of said detecting means; and
measuring means for measuring the inclination of the predetermined area by detecting the change of the position of the light beam reflected from the predetermined area in an area not optically conjugate to the predetermined area.

14. An apparatus according to claim 13, wherein said detecting means detects the position of the condensed beam based upon the focusing state of the condensed light beam from said illuminating means on the predetermined area.

15. An apparatus according to claim 14, wherein said illuminating means illuminates the object with a first condensed light beam to be received by said detecting means and a second condensed light beam to be received by said measuring means.

16. An apparatus according to claim 13, further comprising means for measuring the shape of the object based upon a distance adjusting quantity of said adjusting means.

17. An apparatus for measuring the shape of an object comprising:
illuminating means for illuminating a predetermined area on the object, said illuminating means illuminating with at least one light beam substantially condensed on the predetermined area;
detecting means for detecting a position where said light beam is substantially condensed on the predetermined area;
adjusting means for adjusting a distance between said position and the predetermined area based upon a result obtained by the detection of said detecting means; and
measuring means for measuring the inclination of the predetermined area, said measuring means having separating means for separating the light beam reflected from the predetermined area in accordance with an incident position thereof in an area not optically conjugate to the predetermined area, and a light quantity detecting means for detecting the light quantity of each of the light beams separated by said separating means, with said measuring means measuring the inclination of the predetermined area based upon a comparison between the light quantities of the light beams separated by said separating means.

18. An apparatus according to claim 17, wherein said detecting means detects the position of the condensed beam based upon the focusing state of the condensed light beam from said illuminating means on the predetermined area.

19. An apparatus according to claim 18, wherein said illuminating means illuminates the object with a first condensed light beam to be received by said detecting means and a second condensed light beam to be received by said measuring means.

20. An apparatus according to claim 17, further comprising means for measuring the shape of the object based upon a distance adjusting quantity of said adjusting means.

21. An apparatus for measuring the shape of an object comprising:
illumination means for illuminating a first area on the object, said illuminating means illuminating with at least one light beam substantially condensed on the first area;
detecting means for detecting a position where said light beam is substantially condensed on a second area, the center of which is substantially coincident with that of the first area;
adjusting means for adjusting a distance between said position and the second area based upon a result obtained by the detection of said detecting means; and measuring means for measuring the inclination of the first area by detecting the change of the position of the light beam reflected from the first area in an area not optically conjugate to the first area.

22. An apparatus according to claim 21, wherein said detecting means detects the position of the condensed beam based upon the focusing state of the condensed light beam from said illuminating means on the second area.

23. An apparatus according to claim 22, wherein said illuminating means illuminates the object with a first condensed light beam condensed on the first area and being received by said measuring means and, further, with a second condensed light beam condensed on the second area and being received by said detecting means.

24. An apparatus according to claim 21, further comprising means for measuring the shape of the object based upon a distance adjusting quantity of said adjusting means.

25. An apparatus for measuring the shape of an object comprising:
illuminating means for illuminating a first area on the object, said illuminating means illuminating with at least one light beam substantially condensed in the first area;
detecting means for detecting a position where said light beam is substantially condensed on a second area of the object, the center of which is substantially coincident with that of the first area;
adjusting means for adjusting a distance between said position and the second area based upon a result obtained by the detection of said detecting means; and
measuring means for measuring the inclination of the first area, said measuring means having separating means for separating the light beam reflected from the first area in accordance with an incident position thereof in an area not optically conjugate to the first area, and a light quantity detecting means for detecting the light quantity of each of the light beams separated by said separating means, with said measuring means measuring the inclination of the predetermined area based upon a comparison between the light quantities of the light beams separated by said separating means.

26. An apparatus according to claim 25, wherein said detecting means detects the position of the condensed beam based upon the focusing state of the condensed light beam from said illuminating means on the second area.

27. An apparatus according to claim 26, wherein said illuminating means illuminates the object with a first condensed light beam condensed on the first area and being received by said measuring means and, further, with a second condensed light beam condensed on the second area and being received by said detecting means.

28. An apparatus according to claim 25, further comprising means for measuring the shape of the object based upon a distance adjusting quantity of said adjusting means.

29. A measuring apparatus comprising:
illuminating means for illuminating a predetermined area on an object, said illuminating means illuminating with at least one light beam substantially condensed on the predetermined area;
adjusting means for adjusting a distance between a focussing position of the condensed light beam and a plane on which the predetermined area exists;
measuring means for measuring the inclination of the predetermined area by detecting a position of the light beam reflected from the predetermined area in a plane not optically conjugate to the predetermined area.

30. An apparatus according to claim 29, wherein said adjusting means adjusts said distance to zero.

31. An apparatus according to claim 29, further comprising detecting means for detecting a position of the predetermined area substantially along a direction parallel to an optical axis of an optical system of at least one of said illuminating means and said adjusting means.

32. An apparatus according to claim 31, wherein said detecting means detects the position by using said adjusting means.

33. A measuring method comprising:
illuminating a predetermined area on an object with at least one light beam substantially condensed on the predetermined area;
adjusting a distance between a focussing position of the condensed light beam and a plane on which the predetermined area exists; and
measuring the inclination of the predetermined area by detecting a position of the light beam reflected from the predetermined area in a plane not optically conjugate to the predetermined area.

34. A method according to claim 33, further comprising the step of detecting the position of the predetermined area substantially along a direction parallel to an optical axis of an optical system used for adjusting the distance between the focussing position and the plane.

35. A measuring apparatus comprising:
illuminating means for illuminating a predetermined area on an object, said illuminating means illuminating with at least one light beam substantially condensed on the predetermined area;
adjusting means for adjusting a distance between a focussing position of the condensed light beam and a plane on which the predetermined area exists; and
measuring means for measuring the inclination of the predetermined area, said measuring means having separating means for separating the light beam reflected from the predetermined area at a position not optically conjugate to the predetermined area, and light quantity detecting means for detecting light quantity of at least one of the light beams separated by said separating means, wherein said measuring means measures the inclination on the basis of a result obtained by the detection of said light quantity detecting means.

36. An apparatus according to claim 35, further comprising detecting means for detecting a position of said predetermined area substantially along a direction parallel to an optical axis of an optical system of at least one of said illuminating means and said adjusting means.

37. An apparatus according to claim 36, wherein said detecting means detects the position by using said adjusting means.

38. A measuring apparatus comprising:
illuminating means for illuminating a first area on an object arranged on a plane, said illuminating means illuminating with at least one light beam substantially condensed on the first area;
adjusting means for adjusting a distance between a focussing position of the condensed light beam and a second area on the same plane of the object, the center of which is substantially coincident with that of the first area; and measuring means for measuring the inclination of the first area by detecting a position of the light beam reflected from the first area in a plane not optically conjugate to the first area.

39. An apparatus according to claim 38, further comprising detecting means for detecting a position of said second area substantially along a direction parallel to an optical axis of an optical system of at least one of said illuminating means and said adjusting means.

40. An apparatus according to claim 39, wherein said detecting means detects the position by using said adjusting means.

41. A measuring apparatus comprising:

illuminating means for illuminating a first area on an object arranged on a plane, said illuminating means illuminating with at least one light beam substantially condensed on the first area;

adjusting means for adjusting a distance between a focussing position of the condensed light beam and a second area on the same plane of the object, the center of which is substantially coincident with that of the first area;

measuring means for measuring the inclination of the first area, said measuring means having separating means for separating the light beam reflected from the first area at a position not optically conjugate to the first area, and light quantity detecting means for detecting a light quantity of at least one of the light beams separated by said separating means, wherein said measuring means measures the inclination on the basis of a result obtained by the detecting of said light quantity detecting means.

42. An apparatus according to claim 41, further comprising detecting means detecting a position of the second area substantially along a direction parallel to an optical axis of an optical system of at least one of said illuminating means and said adjusting means.

43. An apparatus according to claim 42, wherein said detecting means detects the position by using said adjusting means.

44. A measuring apparatus comprising:

illuminating means for illuminating a predetermined area on an object, said illuminating means illuminating with at least one light beam substantially condensed on the predetermined area;

adjusting means for adjusting a distance between a focussing position of the condensed light beam and a plane on which the predetermined area exists;

measuring means for measuring inclination of the predetermined area by detecting a position of the light beam reflected from the predetermined area in a plane not optically conjugate to the predetermined area.

45. An apparatus according to claim 44, wherein said adjusting means adjusts said distance to zero.

46. A measuring method comprising:

illuminating a predetermined area on an object with at least one light beam substantially condensed on the predetermined area;

adjusting a distance between a focussing position of the condensed light beam and a plane on which the predetermined area exists;

measuring inclination of the predetermined area by detecting a position of the light beam reflected from the predetermined area in a plane not optically conjugate to the predetermined area.

47. A measuring apparatus comprising:

at least one light source;

an illuminating optical system for illuminating a predetermined area on an object, said illuminating optical system illuminating with at least a light beam from said light source substantially condensed on the predetermined area;

an adjusting mechanism for adjusting a distance between a focussing position of the condensed light beam and a plane on which the predetermined area exists; and at least one sensor for detecting a position of the light beam reflected from the predetermined area in a plane not optically conjugate to the predetermined area, wherein measurement of an inclination of the predetermined area is carried out on the basis of a result obtained by the detection of said sensor.

* * * * *

UNITED STATES PATENT AND TRADEMARK OFFICE
CERTIFICATE OF CORRECTION

PATENT NO. : 5,033,856

DATED : July 23, 1991

INVENTOR(S) : Noriyuki Nose, et al.

It is certified that error appears in the above-identified patent and that said Letters Patent is hereby corrected as shown below:

COLUMN 3:

Line 10, "lens 20" should read --lens 12--.

Line 38, "$\triangle_I = I_B - I_A$" should read --$\triangle I = I_B - I_A$--.

COLUMN 4:

Line 67, "ing 24" should read --ing 22--.

COLUMN 5:

Line 67, "$\alpha I (= I_B - I_A)$" should read --$\triangle I (= I_B - I_A)$--.

COLUMN 7:

Line 5, "collimeter" should read --collimator--.

Line 7, "bandpass" should read --band-pass--.

COLUMN 8:

Lines 30-48, delete in their entirety.

UNITED STATES PATENT AND TRADEMARK OFFICE
CERTIFICATE OF CORRECTION

PATENT NO. : 5,033,856

DATED : July 23, 1991

INVENTOR(S) : Noriyuki Nose, et al.

It is certified that error appears in the above-identified patent and that said Letters Patent is hereby corrected as shown below:

COLUMN 14:

Lines 1-26, Claims 44 to 46 should be deleted.

Title page, after the Abstract, "47 Claims" should read --44 Claims--.

Signed and Sealed this

Twenty-third Day of March, 1993

*Attest:*

STEPHEN G. KUNIN

*Attesting Officer*      *Acting Commissioner of Patents and Trademarks*